(12) United States Patent
Kim et al.

(10) Patent No.: US 9,407,152 B2
(45) Date of Patent: *Aug. 2, 2016

(54) CURRENT REGULATION APPARATUS

(71) Applicant: LG INNOTEK CO., LTD., Seoul (KR)

(72) Inventors: Young Jong Kim, Seoul (KR); Hyun Sik Kim, Seoul (KR); Taek Soo Kim, Seoul (KR); Dong Young Huh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/794,118

(22) Filed: Jul. 8, 2015

(65) Prior Publication Data

US 2015/0311809 A1 Oct. 29, 2015

Related U.S. Application Data

(63) Continuation of application No. 14/001,606, filed on Nov. 11, 2013, now Pat. No. 9,112,420.

(51) Int. Cl.
*H05B 37/02* (2006.01)
*H02M 3/335* (2006.01)
*H05B 33/08* (2006.01)

(52) U.S. Cl.
CPC ....... *H02M 3/33507* (2013.01); *H05B 33/0815* (2013.01); *H05B 37/02* (2013.01); *Y02B 20/347* (2013.01)

(58) Field of Classification Search
CPC .... H05B 33/0815; H05B 37/02; H05B 41/36; H02M 1/32; H02M 3/335

USPC .......... 315/185 R, 209 R, 224, 225, 274, 276, 315/291, 294, 307, 308; 363/21.12, 21.16, 363/78

See application file for complete search history.

(56) References Cited

U.S. PATENT DOCUMENTS 5,999,433 A * 12/1999 Hua ...................... H02M 3/337
363/132
7,310,248 B2 12/2007 Mori
(Continued)

FOREIGN PATENT DOCUMENTS

| CN | 201352769 Y | 11/2009 |
| CN | 201608645 U | 10/2010 |

(Continued)

OTHER PUBLICATIONS

International Search Report for International Application No. PCT/KR2011/007485.

(Continued)

*Primary Examiner* — Tung X Le
(74) *Attorney, Agent, or Firm* — LRK Patent Law Firm

(57) ABSTRACT

A current regulation apparatus is provided. The current regulation apparatus includes a trans unit, a first switching unit, a voltage detection unit, a voltage comparison unit, and a control unit. The trans unit includes an auxiliary winding unit. The first switching unit controls an operation of the trans unit. The voltage detection unit detects a voltage induced to the auxiliary winding unit. The voltage comparison unit compares a voltage detected by the voltage detection unit and a reference voltage. The control unit adjusts a turn-on section of the first switching unit according to an output voltage of the voltage comparison unit.

20 Claims, 3 Drawing Sheets

(56) References Cited

U.S. PATENT DOCUMENTS

| | | |
|---|---|---|
| 7,545,654 B2 | 6/2009 | Berghegger |
| 7,894,223 B2 | 2/2011 | Sato et al. |
| 2002/0186571 A1 | 12/2002 | Tsuge |
| 2007/0115696 A1 | 5/2007 | Berghegger |
| 2008/0232142 A1 | 9/2008 | Yang |
| 2008/0259650 A1 | 10/2008 | Huynh et al. |
| 2009/0256533 A1 | 10/2009 | Wu et al. |
| 2010/0033136 A1 | 2/2010 | Yang |
| 2010/0097104 A1 | 4/2010 | Yang et al. |
| 2010/0321956 A1 | 12/2010 | Yeh |
| 2011/0157922 A1 | 6/2011 | Konecny et al. |
| 2011/0205770 A1 | 8/2011 | Isogai et al. |
| 2013/0127356 A1* | 5/2013 | Tanaka et al. ............. 315/200 R |

FOREIGN PATENT DOCUMENTS

| | | |
|---|---|---|
| CN | 101977466 A | 2/2011 |
| EP | 1788696 A2 | 5/2007 |
| KR | 20-1996-0003277 U | 1/1996 |
| KR | 10-2006-0046004 A | 5/2006 |
| KR | 20070053104 A | 5/2007 |
| TW | 200838105 A | 9/2008 |
| TW | 200943021 A | 10/2009 |
| TW | 201018062 A | 5/2010 |
| TW | 201101666 A | 1/2011 |

OTHER PUBLICATIONS

KIPO Office Action for Korean Patent Application No. 10-2011-0016765 which corresponds to the above-identified U.S. application.

TIPO Office Action for Taiwanese Patent Application No. 101105643 which corresponds to the above-identified U.S. application.

SIPO Office Action for Chinese Patent Application No. 201180070002.2 which corresponds to the above-identified U.S. application.

* cited by examiner

CURRENT REGULATION APPARATUS

CROSS REFERENCE TO RELATED APPLICATION

This application is a continuation of application Ser. No. 14/001,606, filed Nov. 11, 2013, which is a 371 of PCT/KR2011/007554, filed Oct. 12, 2011, which claims the benefit of Korean Patent Application No. 10-2011-0016765, filed Feb. 24, 2011, which are hereby incorporated by reference in their entireties into this application.

BACKGROUND OF THE INVENTION

1. Technical Field

The present disclosure relates to a current regulation apparatus.

2. Description of the Related Art

Generally, to stabilize an output voltage of a Switching Mode Power Supply (SMPS), the related art disposes an error detection circuit in an output voltage switching unit of a trans unit, detects an error of an output voltage with the error detection circuit, and feeds back the detected error voltage to a power change unit through an opto coupler, thereby controlling the output voltage.

The trans unit changes a current to a current suitable for an Light Emitting Diode (LED) and supplies the changed current to the LED. As a device for regulating the current of the LED, an opto coupler is being used.

SUMMARY OF THE INVENTION

A device such as an opto coupler for feedback is expensive, technology is being researched for manufacturing a power source circuit of a trans unit, which does not require a high accuracy of an output voltage, at low cost.

Embodiments provide a current regulation apparatus which regulates an output current of a trans unit according to a voltage level that is detected from an auxiliary winding unit of the trans unit.

Embodiments also provide a current regulation apparatus which detects a voltage from the auxiliary winding unit of a trans unit and compares the detected voltages, thereby regulating a constant current according to the change of an input and/or output voltage of the trans unit.

In one embodiment, a current regulation apparatus includes: a trans unit including an auxiliary winding unit; a first switching unit controlling an operation of the trans unit; a voltage detection unit detecting a voltage induced to the auxiliary winding unit; a voltage comparison unit comparing a voltage detected by the voltage detection unit and a reference voltage; and a control unit adjusting a turn-on section of the first switching unit according to an output voltage of the voltage comparison unit.

DESCRIPTION OF THE PREFERRED EMBODIMENTS

Hereinafter, a current regulation apparatus according to embodiments will be described in detail with reference to the accompanying drawings.

Figure 1:
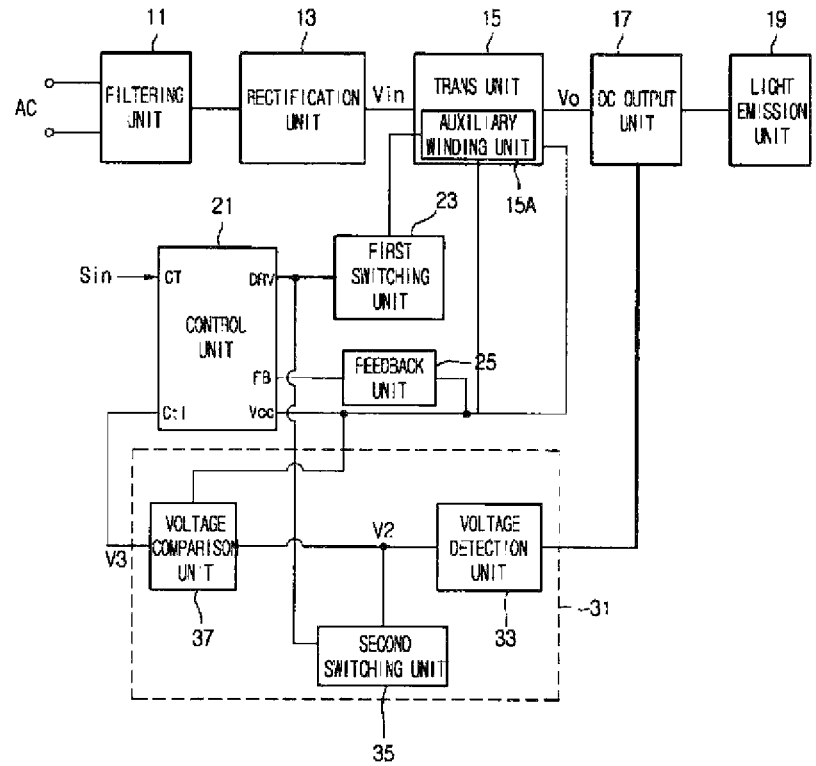
FIG. 1 is a block diagram illustrating a current regulation apparatus according to an embodiment.

FIG. 1 is a block diagram illustrating a current regulation apparatus according to an embodiment.

Referring to FIG. 1, a current regulation apparatus according to an embodiment includes a filtering unit 11, a rectification unit 13, a trans unit 15, a Direct Current (DC) output unit 17, a light emission unit 19, a control unit 21, a first switching unit 23, a feedback unit 25, and an error voltage detection unit 31.

The filtering unit 11 removes noise included in an input Alternating Current (AC) voltage. The filtering unit 11 may include an electromagnetic interference (EMI) filter, for example, include a capacitor.

The rectification unit 13 rectifies a voltage outputted from the filtering unit 11 and supplies the rectified voltage to the trans unit 15. The rectification unit 13 includes a bridge diode circuit, which full wave-rectifies the voltage outputted from the filtering unit 11 and supplies the rectified voltage.

An output voltage Vin of the rectification unit 13 is inputted to the trans unit 15, which outputs a voltage to a secondary side according to the turn-on of the first switching unit 23. An output voltage Vo of the trans unit 15 is supplied to the light emission unit 19 by the DC output unit 17. The DC output unit 17 includes a smoothing circuit, which smoothes a voltage necessary for a load and outputs the smoothed voltage.

The light emission unit 19 includes a plurality of LEDs 19A, which may be connected in serial or serial-parallel. Herein, the serial-parallel connection includes a circuit where groups of the serially-connected LEDs 19A are connected in parallel.

The control unit 21 controls a Pulse Width Modulation (PWM) signal and outputs the PWM signal through a driving terminal DRV, according to signals that are respectively inputted through an input terminal CT and a control terminal Ctl. A signal outputted through the driving terminal DRV of the control unit 21 turns on/off the first switching unit 23. A voltage induced to a primary side of the trans unit 15 is outputted to the secondary side according to the turn-off of the first switching unit 23.

The control unit 21 includes a Power Factor Compensation (PFC) circuit, which regulates a current, based on the change of the output voltage of the trans unit 15, without any change. That is, the control unit 2 detects an error due to the change of the output voltage of the trans unit 15 to controls a duty ratio of the first switching unit 23, thereby regulating a current applied to the light emission unit 19 without any change.

The auxiliary winding unit 15A of the trans unit 15 is connected to the error voltage detection unit 31 and the feedback unit 25, and the error voltage detection unit 31 and the feedback unit 25 may be respectively connected to both ends of the auxiliary winding unit 15A. However, the embodiment is not limited thereto.

The feedback unit 25 outputs a voltage, detected through the auxiliary winding unit 15A, to a feedback terminal FB of the control unit 21. The control unit 21 detects an opened state or overloaded state of the light emission unit 19 with the voltage detected through the feedback unit 25, and controls the driving of the first switching unit 23 according to the detected state. Also, a voltage applied to the auxiliary winding unit 15A is supplied to a power source terminal Vcc of the control unit 21.

A voltage outputted from the auxiliary winding unit 15A is detected as a voltage proportional to the level of the input voltage Vin or output voltage Vo of the trans unit 15.

Figure 2:
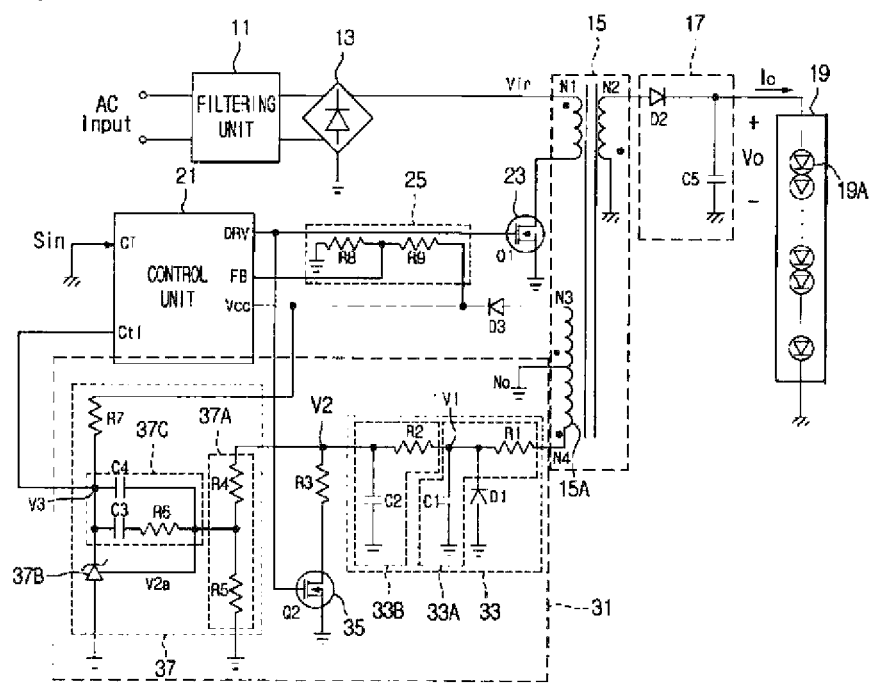
FIG. 2 is a circuit diagram illustrating the current regulation apparatus of FIG. 1.

The error voltage detection unit 31, as illustrated in FIGS. 1 and 2, includes a voltage detection unit 33, a second switching unit 35, and a voltage comparison unit 37. The voltage detection unit 33 is connected to a first tap of the auxiliary winding unit 15A. The voltage detection unit 33 charges and smoothes an input voltage or discharges the charged voltage, thereby allowing the input voltage to be detected at a constant DC level. A voltage V2 of the voltage detection unit 33 is outputted to the voltage comparison unit 37 during a turn-off section of the second switching unit 35. The voltage comparator 37 compares the voltage V2 detected by the voltage detection unit 33 with a reference voltage therein to output a signal to the control terminal Ctl of the control unit 21.

The second switching unit 35 and the first switching unit 23 are simultaneously turned on/off by a driving signal of the control unit 21.

When the voltage V2 detected by the voltage detection unit 33 exceeds the reference voltage, the voltage comparison unit 37 decreases the level of an output voltage V3 of the voltage comparison unit 37. When the voltage V3 inputted to the control terminal Ctl is reduced in level, the control unit 21 adjusts the driving signal so as to shorten a turn-on section of the first switching unit 23. Therefore, an output current of the trans unit 15 is decreased in proportion to a decrease rate of the turn-on section of the first switching unit 23, and moreover, a current inputted to the light emission unit 19 is reduced.

When the voltage V2 detected by the voltage detection unit 33 is less than the reference voltage, the voltage comparison unit 37 increases the level of the output voltage V3 of the voltage comparison unit 37. When the level of the voltage inputted to the control terminal Ctl increases, the control unit 21 adjusts the driving signal so as to increase shorten the turn-on section of the first switching unit 23. Therefore, the output current of the trans unit 15 is increased in proportion to an increase rate of the turn-on section of the first switching unit 23, and moreover, a current inputted to the light emission unit 19 is increased.

Herein, when the input voltage of the trans unit 15 is changed, the control unit 21 compensates for an error current, which is caused by the change of the output voltage of the trans unit 15, according to an error voltage detected by the error voltage diction unit 31 through the auxiliary winding unit 15A of the trans unit 15, thereby allowing a constant current to be supplied.

When the output current of the trans unit 15 is changed or the input voltage of the trans unit 15 is changed, the error voltage detection unit 31 detects and supplies an error voltage in order for a constant current to be supplied to the light emission unit 19. The error voltage detection unit 31 has a structure that receives the feedback of a voltage for regulating a current from the auxiliary winding unit 15A of the trans unit 15, and uses a Primary Side Regulation (PSR) scheme.

FIG. 2 is a circuit diagram illustrating the current regulation apparatus of FIG. 1.

Referring to FIG. 2, the trans unit 15 includes a primary winding N1, a secondary winding N2, and the auxiliary winding unit 15A. A first tap of the primary winding N1 is connected to an output terminal, of the rectification unit 13, and a second tap of the primary winding N1 is connected to a drain of the first switching unit 23. The first switching unit 23 may be configured with a Bipolar Junction Transistor (BJT) or a Metal Oxide Semiconductor Field Effect Transistor (MOSFET).

The DC output unit 17 is connected to the secondary winding N2 of the trans unit 15. The DC output unit 17 includes a second diode D2, and a fifth capacitor D5 that has one end connected to a cathode of the second diode D2 in parallel and another end connected to a ground terminal. The second diode D2 and the fifth capacitor C5 smooth a voltage outputted to the secondary winding N2 of the trans unit 15 and output the smoothed voltage.

The error voltage detection unit 31 is connected to the first tap of the auxiliary winding unit 15A of the trans unit 15. The feedback unit 25 is connected to the second tap of the auxiliary winding unit 15A of the trans unit 15. A center tap of the auxiliary winding unit 15A of the trans unit 15 is grounded. A voltage, which has polarity opposite to that of the secondary winding N2 of the trans unit 15, is induced to the first tap of the auxiliary winding unit 15A. A voltage, which has the same polarity as that of the secondary winding N2 of the trans unit 15, is induced to the second tap of the auxiliary winding unit 15A.

A third diode D3 is connected to the second tap of the auxiliary winding unit 15A. A voltage passing through the third diode D3 is supplied to the feedback terminal FB and power source terminal Vcc of the control unit 21 through the feedback unit 25.

The feedback unit 25 includes a plurality of voltage-dividing resistors R8 and R9, and feeds back a voltage-divided voltage that has passed through the voltage-dividing resistors R8 and R9.

The voltage detection unit 33 of the error voltage detection unit 31 includes first and second time constant circuits 33A and 33B. The first time constant circuit 33A includes a first resistor R1 connected, to the first tap of the auxiliary winding unit 15A at one end thereof, and a first capacitor C1 connected to another end of the first resistor R1 in parallel. The second time constant circuit 33B includes a second resistor R2 serially connected to the other end of the first resistor R1 at one end thereof, and a second capacitor C2 connected to another end of the second resistor R2 in parallel. The first time constant circuit 33A stores a voltage induced to the auxiliary winding unit 15A of the trans unit 15, and discharges the stored voltage. A time constant of the first time constant circuit 33A may be one to one hundred times greater than the turn-on time of the first switching unit 23.

Herein, a voltage, which is applied to the first tap of the auxiliary winding unit 15A, is inputted by a turns ratio of the secondary winding N2 and first auxiliary winding N4 of the trans unit 15, and moreover is inputted by a turns ratio of the primary winding N1 and first auxiliary winding N4 of the trans unit 15. The voltage inputted to the first tap may be regulated in proportion to the level of the output voltage of the trans unit 15 by adjusting the turns ratio. A voltage, which is applied to the second tap of the auxiliary winding unit 15A, is inputted, by a turns ratio of the secondary winding N2 and second auxiliary winding N3 of the trans unit 15, and moreover may be regulated in proportion to the level of the output voltage of the trans unit 15 by adjusting the turns ratio.

The first resistor R1 is connected to the first diode D1 having a grounded anode, and when a control voltage is a negative voltage, the first diode D1 is connected to the ground terminal.

The second time constant circuit 33B stores an output voltage of the first time constant circuit 33A, and discharges the stored voltage. In this case, the voltage discharged by a time constant may be outputted as a smoothed voltage V2.

Figure 3:
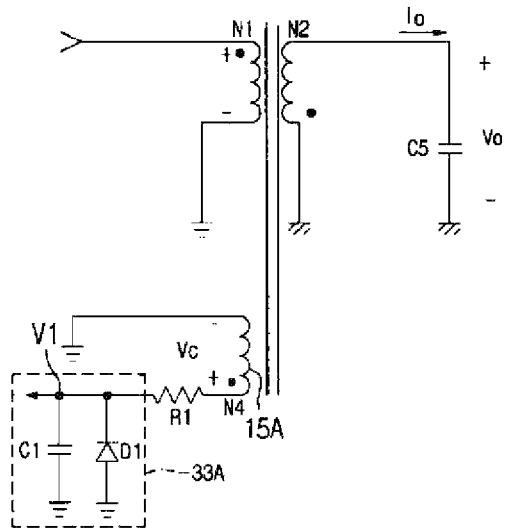
FIG. 3 is a diagram illustrating a charging operation of a first time constant circuit in a turn-on section of a first switching unit of FIG. 1.
Figure 4:
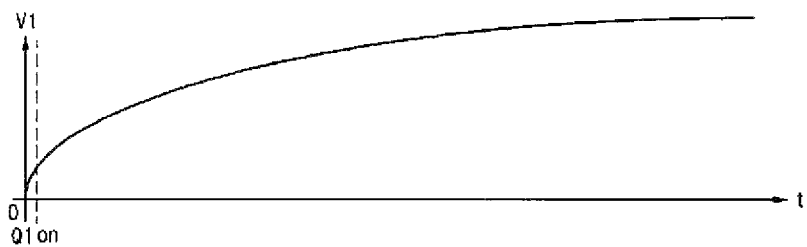
FIG. 4 is a charging waveform diagram of the first time constant circuit of FIG. 3.
Figure 5:
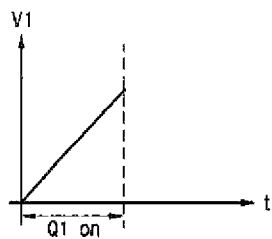
FIG. 5 is a partially enlarged diagram of FIG. 4.

FIG. 3 is a diagram for describing an operation of the first time constant circuit in a turn-on section of the first switching unit 23. FIG. 4 shows a voltage applied to the first time constant circuit. FIG. 5 is a partially enlarged diagram of FIG. 4.

In FIG. 4, a voltage applied to the first time constant circuit increases linearly during the turn-on section of the first switching unit 23 as in FIG. 3. Herein, for example, when an operation switching frequency of the first switching unit 23 is about 70 KHz, a time taken until the input voltage of the trans unit 15 is applied to the second tap of the auxiliary winding unit 15A is shorter than about 14.28 us. Herein, by adjusting values of the first resistor R1 and first capacitor C1 of the first time constant circuit 33A, a time constant is set to one to one hundred times greater than that of the turn-on section of the first switching unit 23, and thus, a linearly increased voltage V1 is obtained. The first capacitor C1 is charged as in FIG. 5.

Herein, Vc=(N4/N1)*Vin.

Figure 6:
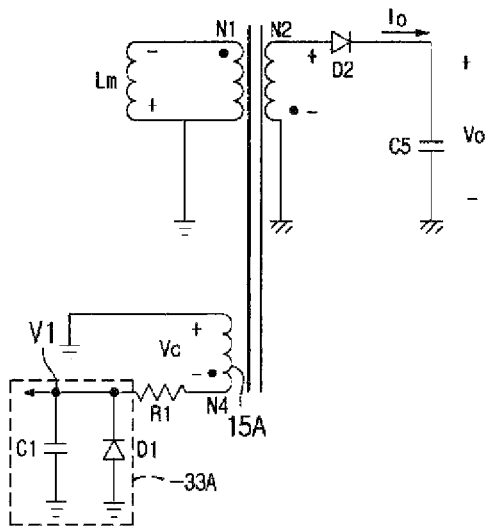
FIG. 6 is a diagram illustrating a discharging operation of the first time constant circuit in a turn-off section of the first switching unit of FIG. 1.
Figure 7:
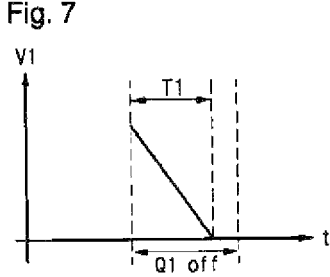
FIG. 7 is a discharging waveform diagram of the first time constant circuit of FIG. 6.
Figure 8:
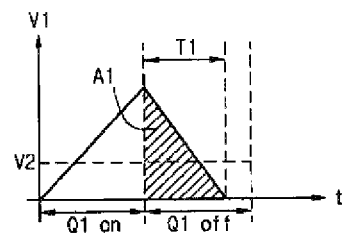
FIG. 8 is a charging and discharging waveform diagram of the first time constant circuit of FIG. 2.

FIG. 6 is a diagram for describing an operation of the first time constant circuit in a turn-off section of the first switching unit. FIGS. 7 and 8 are graphs showing the voltage of the first time constant circuit.

Referring to FIGS. 2 and 6, when the first switching unit 23 is turned off, the output voltage of the trans unit 15 is applied to the winding of the auxiliary winding unit 15A, in which case an expended time may be less than about 14.28 us. The voltage Vc applied to the first time constant circuit 33A is linearly reduced by the time constant value of the first time constant circuit 33A as in the graph of FIG. 7.

Herein, Vc=−(N4/N2)*Vo.

FIG. 8 is a diagram showing a voltage waveform of the first time constant circuit 33A in the turn-on and turn-off sections of the first switching unit. A discharging time T1 of the second time constant circuit 33B may be shorter than the turn-off time of the first switching unit 23.

Herein, the area of a region A1 in FIG. 8 may be obtained in the turn-off section of the first switching unit 23, and by using the area of the region A1 information regarding an output current Io of the trans unit 15 may be obtained with Equation (1) below.

$$\frac{N_1}{N_2}V_0 = L_M \frac{di_0}{dt} \quad (1)$$

$$i_0 = \frac{N_1}{N_2 L_M} \int V_0 dt$$

Referring to FIG. 2, the voltage of the first time constant circuit 33A, namely, a triangular waveform signal is outputted as a constant DC voltage due to the time constant value of the second time constant circuit 33B. That is, the second time constant circuit 33B adjusts the value of the second resistor R2 and the value of the second capacitor C2 to output an input voltage as a smoothed DC voltage.

Therefore, by adjusting the time constant value of the second time constant circuit 33B and the time constant value of the first time constant circuit 33A, an output current of the trans unit 15 may be detected.

The output voltage V2 of the second time constant circuit 33B is outputted to the voltage comparison unit 37. At this point, the second switching unit 35 is turned off.

The second switching unit 35 may be configured with a BJT or a MOSFET.

A third resistor R3 is connected to a drain of the second switching unit 23, and connected to an output terminal of the second time constant circuit 33B.

A waveform of the output voltage V2, which is generated when the first switching unit 23 is turned on, is generated as in the voltage waveform of FIG. 5. At this point, the second switching unit 35 is simultaneously turned on, and thus, the output voltage V2 is discharged by the third resistor R3. A waveform of the output voltage V2, which is generated when the first switching unit 23 is turned off, is generated as in FIG. 7. At this point, the second switching unit 35 is simultaneously turned off, and thus, the output voltage V2 is inputted to the voltage comparison unit 37. Moreover, the level of the voltage V2 is not changed by the change of an input voltage due to the third resistor R3, and the voltage V2 is inputted to the voltage comparison unit 37 due to the change of an output current. Therefore, the output current is not changed in spite of the change of the input voltage, and thus, a constant current is outputted.

The voltage comparison unit 37 includes a voltage-dividing unit 37A, comparison unit 37B, and a gain adjustment circuit 37C. The voltage-dividing unit 37A includes fourth and fifth resistors R4 and R5, and voltage-divides the output voltage V2 of the voltage detection unit 33 with the fourth and fifth resistors R4 and R5 to output the voltage-divided voltage to a reference terminal of the comparison unit 37B.

The comparison unit 37B operates as an error amplifier to output an error voltage V3 to the control terminal Ctl of the control unit 21.

The comparison unit 37B compares an input voltage V2a with a reference voltage therein. The comparison unit 37B compares the voltage V2a outputted from the second time constant circuit 33B and the reference voltage therein to output the changed voltage V3 to the control terminal Ctl of the control unit 21.

An anode of the comparison unit 37B is connected to a ground terminal, and a cathode of the comparison unit 37B is connected to the power source terminal Vcc of the control unit 21.

The gain adjustment circuit 37C includes a sixth resistor R6 connected to the voltage-dividing unit 37A, a third capacitor C3 that is connected between the sixth resistor R6 and the cathode of the comparison unit 37C, and a fourth capacitor C4 that is connected to the voltage-dividing unit 37A and the cathode of the comparison unit 37B in parallel. The gain adjustment circuit 37C adjusts a gain of the output voltage V3 of the comparison unit 37B, and thus prevents a malfunction due to a voltage having an abnormal frequency.

Therefore, the control unit 21 increases or decreases the turn-on section of the first switching unit 23 according to the change of the voltage V3 inputted to the control terminal Ctl, thereby regulating the output current of the trans unit 15 without any change.

Herein, when the input voltage Vin of the trans unit 15 rises, the comparison unit 37B decreases the output voltage V3. On the contrary, when the input voltage Vin of the trans unit 15 drops, the comparison unit 37B increases and outputs the output voltage V3. The error voltage detection unit 31 detects an error of an output voltage due to the change of the input voltage of the trans unit 15, and increases or decreases the turn-on section of the first switching unit 23.

The auxiliary winding unit 15A detects an error voltage with the error voltage detection unit 31 to output the error voltage to the control terminal Ctl of the control unit 21. Due to this reason, when the error voltage is fed back to the feedback terminal FB of the control unit 21, a feedback voltage is required to be increased to about 2.5 V, for which the winding number of the auxiliary winding unit 15A is further increased. Due to such limitations, the volume of the trans unit 15 is increased, and efficiency is entirely reduced. Also, when an error voltage is detected to the feedback terminal FB of the control unit 21, the control unit 21 is malfunctioned in controlling the output current, it is difficult to control the voltage of the control terminal Ctl, and there is a limitation in setting the output current.

Figure 9:
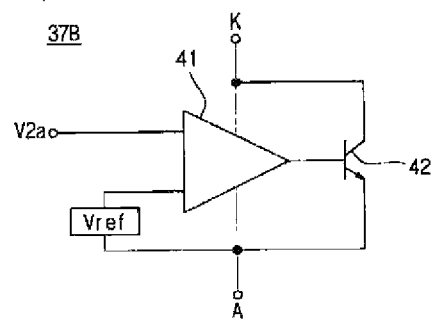
FIG. 9 is a detailed circuit diagram illustrating a comparison unit of FIG. 2.

FIG. 9 is a circuit diagram illustrating a detailed example of the comparison unit.

Referring to FIG. 9, in the comparison unit 27B, the input voltage V2a is inputted to a positive terminal of a comparator 41, and a reference voltage Vref is inputted to a negative terminal of the comparator 41. An output terminal of the comparator 41 is connected to a base of a switching element 42, a collector of the switching element 42 is connected to the cathode of the comparison unit 37B, and an emitter of the switching element 42 is connected to the anode of the comparison unit 37B.

To provide a constant current controlling operation with reference to FIG. 2, when the output current of the trans unit 15 is changed, the voltage V2 that is detected from the voltage detection unit 33 through the auxiliary winding unit 15A is increased. The voltage comparison unit 37 compares the reference voltage and the detected voltage V2, and when the detected voltage V2 is higher than the reference voltage, the voltage comparison unit 37 outputs a decreased voltage to the control terminal Ctl of the control unit 21. The control unit 21 decreases the turn-on section, of the first switching unit 23 in proportion to the decreased voltage that is inputted to the control terminal Ctl of the control unit 21.

When the output current of the trans unit 15 is changed, the voltage V2 that is detected from the voltage detection unit 33 through the auxiliary winding unit 15A is decreased. The voltage comparison unit 37 compares the reference voltage and the detected voltage V2, and when the detected voltage V2 is lower than the reference voltage, the voltage comparison unit 37 outputs an increased voltage, to the control terminal Ctl of the control unit 21. The control unit 21 increases the turn-on section of the first switching unit 23 in proportion to the increased voltage that is inputted to the control terminal Ctl of the control unit 21.

Moreover, the change of the output current of the trans unit 15 may be identically applied even in the change of the input voltage Vin of the trans unit 15.

Therefore, the current regulation apparatus adjusts the turn-on section of the first switching unit 23 by an error value detected by the error voltage detection unit 31, according to the change of the input voltage Vin of the trans unit 15 or the change of the output current Io, thereby allowing the output current of the trans unit 15 to be supplied as a constant current.

Moreover, when a voltage detected from the voltage detection unit 33 is higher than or lower than the reference voltage, the comparison unit 37B of the voltage comparison unit 37 inputs/disconnects a voltage, applied to the power source terminal Vcc of the control unit 21, to/from the control terminal Ctl of the control unit 21, and thus controls the turn-on section of the first switching unit 23.

The above-described current regulation apparatus may be applied to a power module of each of lighting systems such as backlight units, various kinds of display devices, headlamps, streetlamps, indoor lamps, outdoor lamps, signal lights, and lighting lamps.

According to embodiments, an opto coupler can be removed.

According to embodiments, an integrated circuit for controlling a constant current can be removed.

According to embodiments, the volume of a trans unit can be, reduced.

According to embodiments, by adjusting an error of an output voltage of the trans unit, an output current can be stably supplied.

According to embodiments, the reliability of a current regulation apparatus for LED can be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A current regulation apparatus comprising:
   a trans unit comprising an auxiliary winding unit;
   a first switching unit controlling an operation of the trans unit;
   an error voltage detection unit connected to the auxiliary winding unit of the trans unit; and
   a control unit adjusting a turn-on section of the first switching unit according to an output voltage of the error voltage detection unit,
   wherein the control unit includes a feedback terminal and a control terminal, and
   wherein the error voltage detection unit has one end connected to the auxiliary winding unit and another end connected to the control terminal of the control unit.

2. The current regulation apparatus according to claim 1, further comprising a light emission unit comprising a plurality of Light Emitting Diodes (LEDs) which emit light by a voltage outputted to a secondary side of the trans unit.

3. The current regulation apparatus according to claim 2, the detected voltage is outputted to the voltage comparison unit during a turn-off section of the second switching unit by the voltage detection unit.

4. The current regulation apparatus according to claim 3, wherein:
   the error voltage detection unit is connected to a first tap of the auxiliary winding unit of the trans unit,
   the feedback unit is connected to a second tap of the auxiliary winding unit,
   a center tap of the auxiliary winding unit is grounded,
   a voltage having polarity opposite to a secondary winding of the trans unit is induced to the first tap of the auxiliary winding unit, and
   a voltage having the same polarity as the secondary winding of the trans unit is induced to the second tap of the auxiliary winding unit.

5. The current regulation apparatus according to claim 1, wherein the error voltage detection unit comprises:
   a voltage detection unit detecting a voltage induced to the auxiliary winding unit;

a voltage comparison unit comparing a voltage detected by the voltage detection unit and a reference voltage and output a signal to the control terminal of the control unit; and a second switching unit receiving a signal, inputted to an output terminal of the voltage detection unit and the first switching unit, to perform a switching operation.

6. The current regulation apparatus according to claim 5, further comprising a resistor connected to a drain of the second switching, unit and an output terminal of the voltage detection unit, the resistor preventing an input voltage from being transferred to the voltage comparison unit by turn-on of the first switching unit.

7. The current regulation apparatus according to claim 5, wherein the voltage comparison unit comprises:
a comparison unit comparing an output voltage of the voltage detection unit and a reference voltage therein to output a signal to a control terminal, of the control unit; and
a gain adjustment circuit adjusting, a gain of an output voltage of the comparison unit.

8. The current regulation apparatus according to claim 7, wherein the control unit further comprises a power source terminal,
wherein a tap of the auxiliary winding unit is connected to the power source terminal of the control unit through a diode, and
wherein the power source terminal of the control unit is connected to an output terminal of the comparison unit of the voltage comparison unit.

9. The current regulation apparatus according to claim 5, wherein the second switching unit and the first switching unit are simultaneously turned on or turned off by a driving signal of the control unit.

10. The current regulation apparatus according to claim 5, wherein each of the second switching unit and the first switching unit comprises a Bipolar Junction Transistor (BJT) or a Metal Oxide Semiconductor Field Effect Transistor (MOSFET).

11. The current regulation apparatus according to claim 1, further comprising a feedback unit connected to a tap of the auxiliary winding unit to feed back an output voltage of the trans unit to the feedback terminal of the control unit, wherein the error voltage detection unit and the feedback unit are connected to both ends of the auxiliary winding unit, respectively.

12. The current regulation apparatus according to claim 1, wherein the voltage detection unit comprises;
a first time constant circuit connected to the auxiliary winding unit; and
a second time constant circuit smoothing an output voltage of the first time constant circuit.

13. The current regulation apparatus according to claim 1, wherein a voltage proportional to a voltage, induced to a secondary side of the trans unit, is induced to the auxiliary winding unit.

14. The current regulation apparatus according to claim 1, wherein the control unit comprises a power factor compensation circuit.

15. The current regulation apparatus according to claim 1, wherein:
a Direct Current (DC) output unit is connected to a secondary winding of the trans unit, and
the DC output unit comprises a second diode, and a fifth capacitor connected to a cathode of the second diode in parallel, and having other grounded end.

16. A current regulation apparatus comprising:
a trans unit comprising an auxiliary winding unit;
a first switching unit controlling an operation of the trans unit;
an error voltage detection unit connected to the auxiliary winding unit of the trans unit;
a control unit adjusting a turn-on section of the first switching unit according to an output voltage of the error voltage detection unit;
a light emission unit comprising a plurality of Light Emitting Diodes (LEDs) which emit light by a voltage outputted to a secondary side of the trans unit; and
a feedback unit connected to a tap of the auxiliary winding unit to feed back an output voltage of the trans unit to a feedback terminal of the control unit,
wherein the error voltage detection unit has one end connected to the auxiliary winding unit and another end connected to a control terminal of the control unit,
wherein the feedback unit has one end connected to the auxiliary winding unit and another end connected to a feedback terminal of the control unit, and
wherein the error voltage detection unit comprises:
a voltage detection unit detecting a voltage induced to the auxiliary winding unit; and
a voltage comparison unit comparing a voltage detected by the voltage detection unit and a reference voltage and output a signal to the control terminal of the control unit.

17. The current regulation apparatus according to claim 16, wherein the error voltage detection unit further comprises a second switching unit receiving a signal, inputted to an output terminal of the voltage detection unit and the first switching unit, to perform a switching operation, and
wherein the detected voltage is outputted to the voltage comparison unit during a turn-off section of the second switching unit by the voltage detection unit.

18. The current regulation apparatus according to claim 17, further comprising a resistor connected to a drain of the second switching unit and an output terminal of the voltage detection unit, the resistor preventing an input voltage from being transferred to the voltage comparison unit by turn-on of the first switching unit.

19. The current regulation apparatus according to claim 16, wherein the voltage detection unit comprises:
a first time constant circuit connected to the auxiliary winding unit; and
a second time constant circuit smoothing an output voltage of the first time constant circuit.

20. The current regulation apparatus according to claim 16, wherein the error voltage detection unit and the feedback unit are connected to both ends of the auxiliary winding unit, respectively.

* * * * *